(12) United States Patent
Ting et al.

(10) Patent No.: US 8,200,257 B2
(45) Date of Patent: Jun. 12, 2012

(54) CUSTOMIZABLE MOBILE MESSAGE SERVICES

(75) Inventors: Chyr-Chong Ting, San Jose, CA (US); Chyr-Song Ting, San Marcos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1009 days.

(21) Appl. No.: 11/847,899

(22) Filed: Aug. 30, 2007

(65) Prior Publication Data
US 2009/0061911 A1   Mar. 5, 2009

(51) Int. Cl.
*H04W 4/00* (2009.01)
(52) U.S. Cl. ...... 455/466; 455/411; 725/40; 379/142.05
(58) Field of Classification Search .................. 455/411, 455/466; 379/142.05; 725/40
See application file for complete search history.

(56) References Cited

U.S. PATENT DOCUMENTS

| 7,251,495 | B2 | 7/2007 | Keyani | |
|---|---|---|---|---|
| 2003/0007464 | A1* | 1/2003 | Balani | 370/310 |
| 2003/0145063 | A1* | 7/2003 | Asai et al. | 709/217 |
| 2006/0053447 | A1* | 3/2006 | Krzyzanowski et al. | 725/40 |
| 2006/0199568 | A1* | 9/2006 | Seo et al. | 455/414.1 |
| 2008/0189186 | A1* | 8/2008 | Choi et al. | 705/26 |

* cited by examiner

*Primary Examiner* — Jinsong Hu
*Assistant Examiner* — Qun Shen
(74) *Attorney, Agent, or Firm* — Weaver Austin Villeneuve & Sampson LLP (57) ABSTRACT

In one embodiment, a method includes: receiving, at a mobile device, a first service command and a second service command; sending the first service command from the mobile device to a server; sending the second service command from the mobile device to a server; receiving, at the mobile device, first service results corresponding to the first service command; receiving, at the mobile device, second service results corresponding to the second service command; combining the first service results with the second service results; and displaying the combined service results on the mobile device.

24 Claims, 6 Drawing Sheets

CUSTOMIZABLE MOBILE MESSAGE SERVICES

BACKGROUND OF THE INVENTION

1. Field of the Invention

The present invention relates to mobile message services. More particularly, the present invention relates to customizable mobile message services.

2. Description of the Related Art

Mobile messaging protocols, such as Short Message Service (SMS) are utilized to allow mobile devices, such a personal data assistants (PDAs) and cell phones, to send text-based messages to one another. Various server-based services have also been introduced that allow users to send text messages to the service and receive responses with relevant information. For example, a user can type an SMS message saying "s restaurants" and send it to a service provider. A list of restaurants in the user's area may then be returned via an SMS message.

SUMMARY OF THE INVENTION

In one embodiment, a method includes: receiving, at a mobile device, a first service command and a second service command; sending the first service command from the mobile device to a server; sending the second service command from the mobile device to a server; receiving, at the mobile device, first service results corresponding to the first service command; receiving, at the mobile device, second service results corresponding to the second service command; combining the first service results with the second service results; and displaying the combined service results on the mobile device.

In another embodiment, an apparatus includes: a service command receiver; a personalized service command macro storer coupled to the service command receiver and to a memory; an authentication information storer coupled to the memory; a mobile device message receiver; an authenticator coupled to the mobile device message receiver and to the memory; and a personalized service command macro executor coupled to the authenticator and to the memory.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

According to various embodiments of the present invention, users are provided with the ability to create personalized "macros" or programs to execute a customized set or sequence of services. This allows users to set their own programs to perform the common tasks that are of primary importance to the user, as opposed to relying on a service provider to create programs that are only important to a large number of users.

The present invention may be implemented in at least two different ways. In one embodiment, client-side macros are enabled. Here, the service provider may provide a common set of functions that can be performed independently or can be performed in sequence where the results of one operation can be applied to a subsequent operation. Thus, rather than a user being able to only search on restaurants, the user may combine multiple queries into one operation and type, for example, "s japanese restaurant, san jose, ca | d | top 10". In this example, the service provider would then search for Japanese restaurants in San Jose and get directions (=d) for each of the restaurants, returning only the top 10 results. In another example, a user may type "s flight 90 american airline arrival time | c est | cal" and get the arrival time for a flight converted to eastern time. In another example, a user may type "s Dr. Smith, Cupertino, A | a contact" and search for information on Dr. Smith and add the listing to contacts.

In one embodiment, there are built-in filtering, aggregation, and sorting commands such as "Top 5" and "grep." Furthermore, in one embodiment, the provided macro language may be a derivative of an existing scripting language such as Perl, Javascript, Unix shell scripting, etc.

In another embodiment, server-side macros are enabled. Here, the service provider may provide an interface, such as a website, which the user may use to define macros. These macros are linked to the particular user, thus when a mobile message is received from the user, the macros linked for that user may be used. In this embodiment, security may be provided to keep other users from accessing the user's macros. This is especially important if, for example, the user defines macros that access sensitive information, such as bank account records or medical files.

Security may be provided using some sort of identification in the mobile message as well as a password or other authentication scheme. For example, a user name and password may be embedded into the mobile message. Alternatively, digital certificates or biometrics (such as fingerprint scans) can be used.

Figure 1:
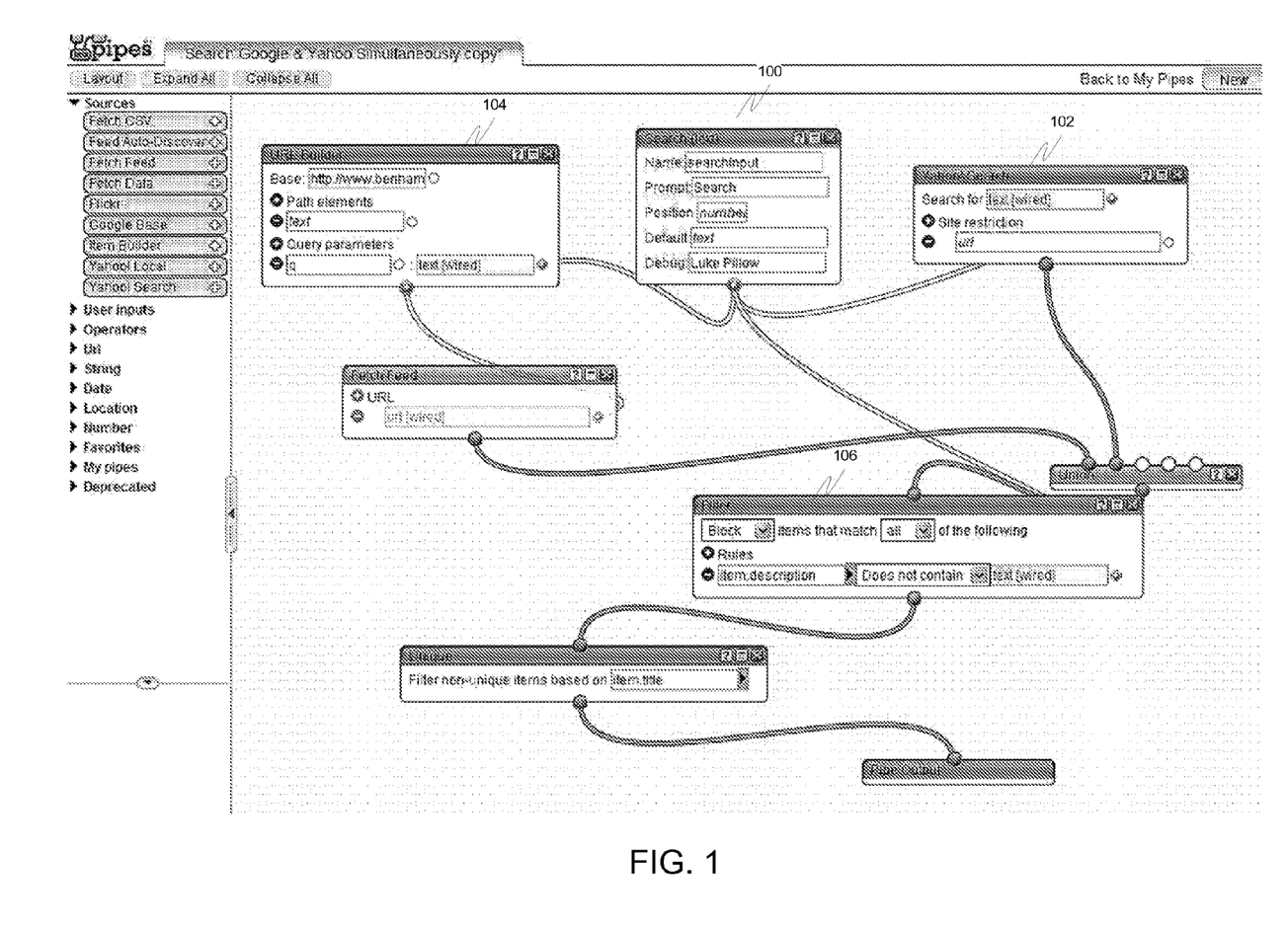
FIG. 1 is a screen capture illustrating an example of a server-side implementation in accordance with an embodiment of the present invention.

In various embodiments, a number of commands may be applied to result sets, including, but not limited to:
Regular Expression
Sort
Truncate
Union
Intersection
Unique
Group By
If/then/else
Loops (while/for/do-while)
String operations such as
   substring
   translate (to different languages)
   replace
   concatenate
   encrypt
   enocde
   reverse
Mathematical functions such as
   avg,
   count
   max
   sum
   ceiling
   floor
   base n conversion
   standard deviation
   sqrt
   median
   variance Various phone specific functions may also be executed, such as
   getGPSLocation
   getCurrentTime
   getCurrentTimeZone
   Other example services include:
   find lowest price for item
   query yahoo answers
   translate languages
   get nearest store/restaurant
   get sports score updates
   get financial information
   stock quotes
   analyst opinions
   stock PE/Earnings or other information
   exchange information
   convert between currency, units (pint->liters, lbs->kilos)
   travel information
   hotjobs (job listings/search)
   get information on music (artist/lyrics)
   bid on auctions/price watch on auction FIG. 1 is a screen capture illustrating an example of a server-side implementation in accordance with an embodiment of the present invention. A search 100 is performed through two different search services 102, 104, and the results are passed through a filter 106. In this example, the macro is created using a graphical user interface that allows the various commands and services to be linked using graphical "pipes."

Figure 2:
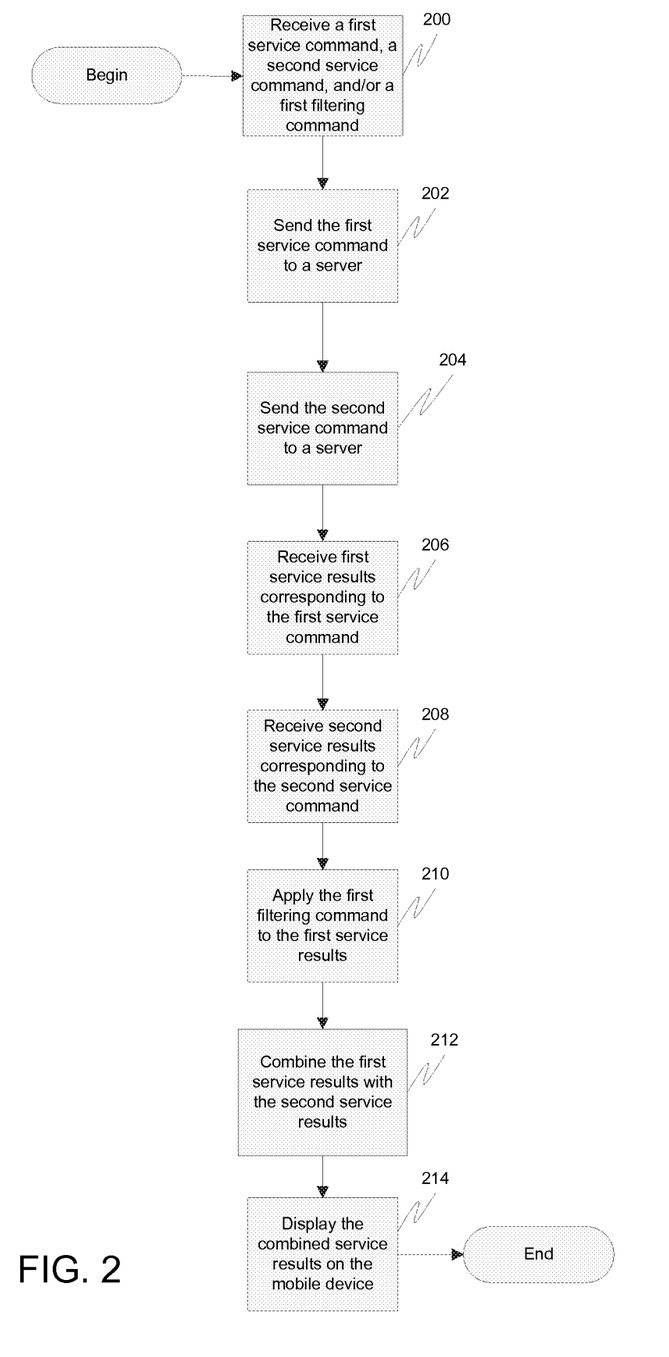
FIG. 2 is a flow diagram illustrating a method for executing client-side macros in accordance with another embodiment of the present invention.

FIG. 2 is a flow diagram illustrating a method for executing client-side macros in accordance with an embodiment of the present invention. Each of the steps illustrated in FIG. 2 may be performed by a mobile device or by software/hardware associated with a mobile device. At 200, a first service command, a second service command, and/or a first filtering command are received at a mobile device. At 202, the first service command is sent to a server. At 204, the second service command is sent to a server. This may or may not be the same server that the first service command was sent to in step 202. Specifically, an embodiment is envisioned wherein service commands are sent to different service providers and the results from the disparate service providers are combined. At 206, first service results corresponding to the first service command are received. At 208, second service results corresponding to the second service command are received. At 210, the first filtering command may be applied to the first service results. At 212, the first service results are combined with the second service results. At 214, the combined service results are displayed on the mobile device. It should be noted that the order in which these steps are presented in FIG. 2 does not necessarily reflect the order that the steps are executed. For example, embodiments are envisioned wherein step 206 is performed before step 204.

Figure 3:
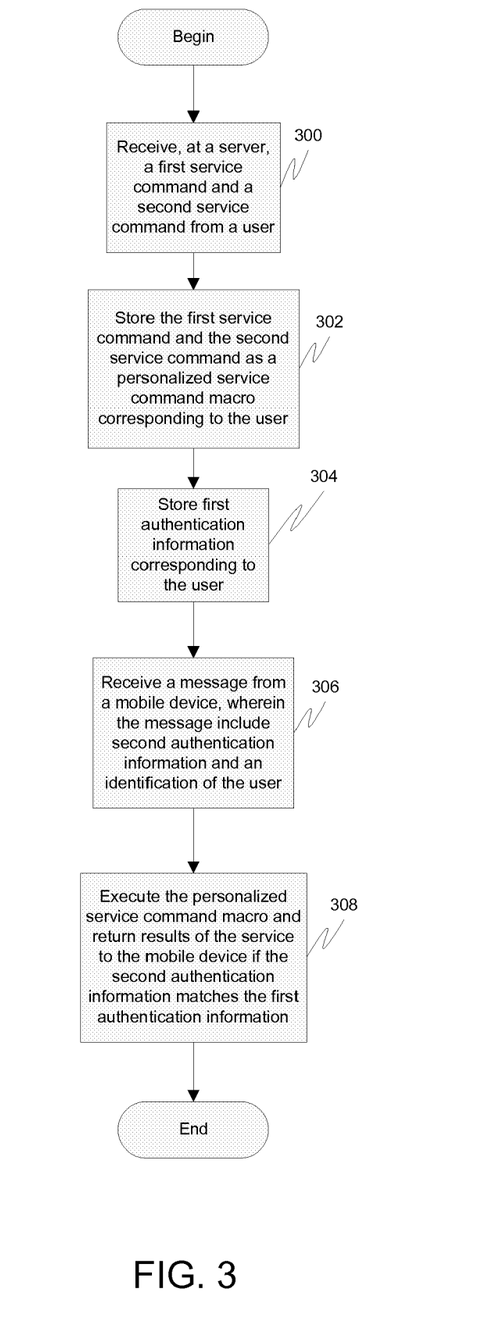
FIG. 3 is a block diagram illustrating a method for executing server-side macros in accordance with an embodiment of the present invention.

FIG. 3 is a flow diagram illustrating a method for executing server-side macros in accordance with another embodiment of the present invention. At 300, a first service command and a second service command are received, at a server, from a user. This may be received from the user via a mobile device. At 302, the first service command and the second service command are stored as a personalized service command macro corresponding to the user. At 304, first authentication information corresponding to the user is stored. At 306, a message, such as an SMS message, is received from a mobile device, wherein the message includes second authentication information and an identification of the user. At 308, the personalized service command macro is executed and results of the service are returned to the mobile device if the second authentication information matches the first authentication information.

Figure 4:
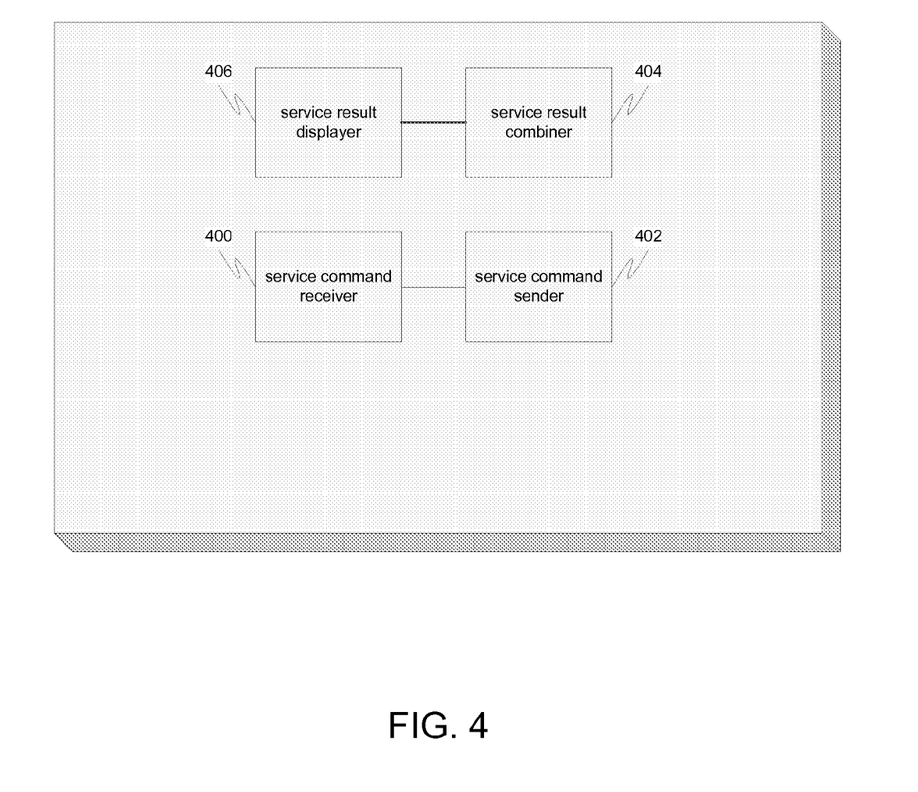
FIG. 4 is a block diagram illustrating an apparatus in accordance with an embodiment of the present invention.

FIG. 4 is a block diagram illustrating an apparatus in accordance with an embodiment of the present invention. This apparatus may be included as software or hardware on a mobile device that also includes a display and a processor. A service command receiver 400 may perform steps 200 and 202 of FIG. 2. A service command sender 402 coupled to the service command receiver 400 may perform steps 204 and 206 of FIG. 2. A service result combiner 404 may perform step 212 of FIG. 2. A service result displayer 406 coupled to the service result combiner 404 may perform step 214 of FIG. 2.

Figure 5:
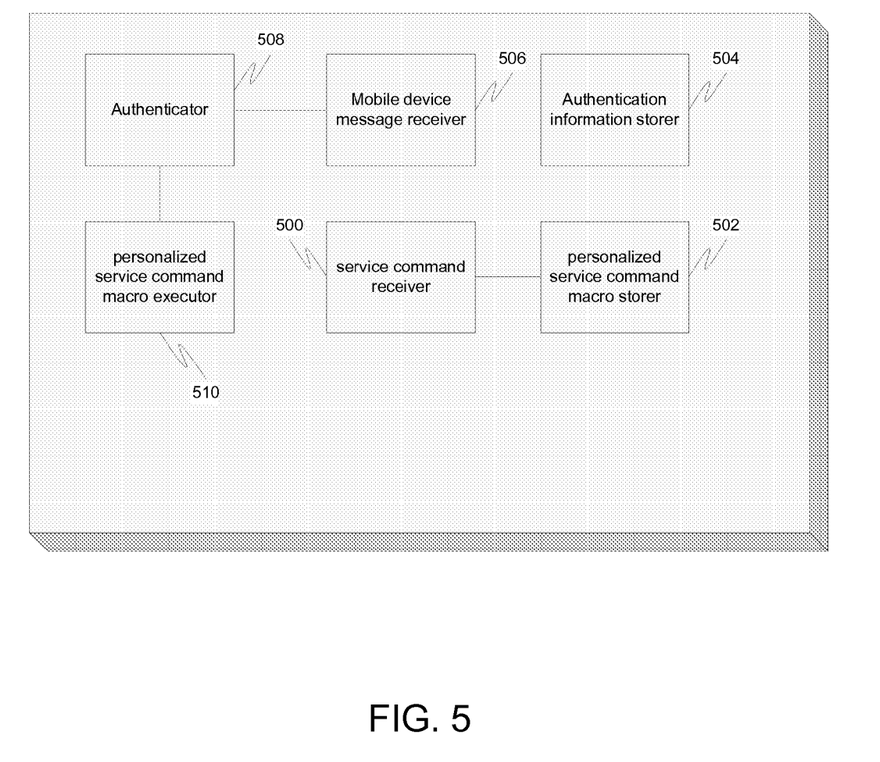
FIG. 5 is a block diagram illustrating an example apparatus in accordance with various embodiments of the invention.

FIG. 5 is a block diagram illustrating an apparatus in accordance with an embodiment of the present invention. This apparatus may be included as software or hardware on a server that also includes a processor. A service command receiver 500 may perform step 300 of FIG. 3. A personalized service command macro storer 502 coupled to the service command receiver 500 and to a memory (not pictured as it may or may not be part of the apparatus) may perform step 302 of FIG. 3. The memory may be, for example, a database. An authentication information storer 504 coupled to the memory may perform step 304 of FIG. 3. A mobile device message receiver 506 may perform step 306 of FIG. 3. An authenticator 508 coupled to the mobile device message receiver 506 and to the memory may perform the authentication aspects of step 308 of FIG. 3. A personalized service command macro executor 510 coupled to the authenticator 508 and to the memory may perform service execution and results returning of step 310 of FIG. 3.

Figure 6:
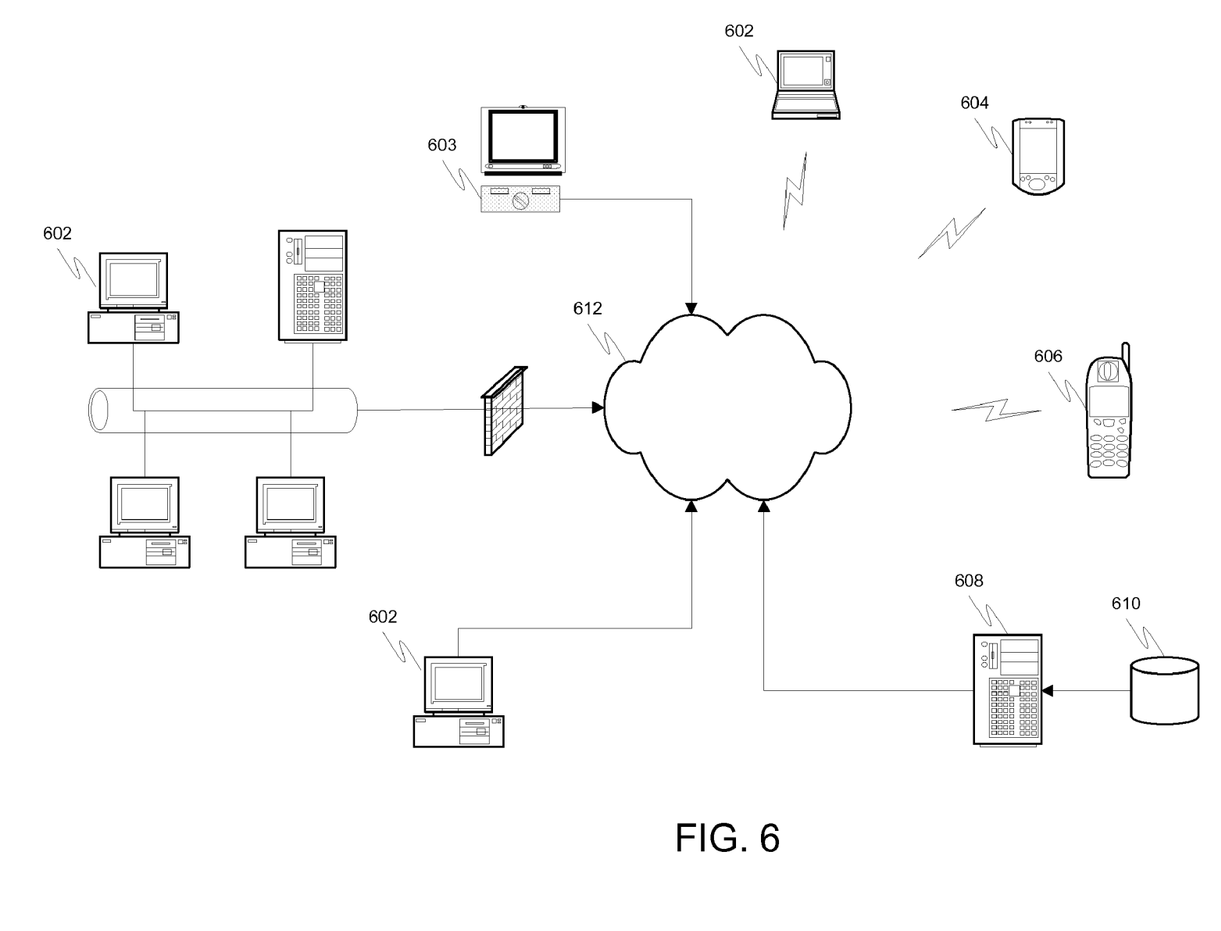
FIG. 6 is a block diagram illustrating an example network environment in which various embodiments may be implemented.

It should also be noted that embodiments of the present invention may be implemented on any computing platform and in any network topology in which presentation of service results is a useful functionality. For example and as illustrated in FIG. 6, implementations are contemplated in which the invention is implemented in a network containing personal computers 602, media computing platforms 603 (e.g., cable and satellite set top boxes with navigation and recording capabilities (e.g., Tivo)), handheld computing devices (e.g., PDAs) 604, cell phones 606, or any other type of portable communication platform. Users of these devices may navigate the network. A user may utilize a mobile device such as 604 and 606 to perform client-side macros and/or to request that a server run server-side macros. Server 608 (or any of a variety of computing platforms) may include a memory, a processor, and a communications component and may then utilize the various techniques described above. The processor of the server 608 may be configured to run, for example, all of the processes described in FIG. 3. Server 608 may be coupled to a database 610, which stores information relating to the personalized service command macros and/or the users. Applications may be resident on such devices, e.g., as part of a browser or other application, or be served up from a remote site, e.g., in a Web page (also represented by server 608 and database 610). The user may utilize computing platforms 602 or 603, for example, to set up the personalized service command macros and input the authentication information. The invention may also be practiced in a wide variety of network environments (represented by network 612), e.g., TCP/IP-based networks, telecommunications networks, wireless networks, etc. The invention may also be tangibly embodied in one or more program storage devices as a series of instructions readable by a computer (i.e., in a computer readable medium).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method comprising:
receiving, at a server, a first service command and a second service command from a user via a graphical user interface such that the first service command, the second service command, and one or more search services are presented in relation to one another via one or more graphical pipes;
storing the first service command and the second service command such that the first service command, the second service command, and the one or more search services are linked according to the one or more graphical pipes as a personalized service command macro corresponding to the user;
receiving a message at the server from a mobile device, wherein the message includes second authentication information and an identification of the user; and
executing, at the server, the personalized service command macro corresponding to the user and returning results of the personalized service command macro to the mobile device according to whether the second authentication information matches first authentication information corresponding to the user;
wherein executing the personalized service command macro comprises executing one or more search queries via the one or more search services;
wherein the results of the personalized service command macro comprise search results obtained as a result of executing the one or more search queries via the one or more search services.

2. The method of claim 1, wherein the first authentication information and the second authentication information comprise passwords.

3. The method of claim 1, wherein the first authentication information and the second authentication information comprise digital certificates.

4. The method of claim 1, wherein the first authentication information and the second authentication information comprise biometrics.

5. The method of claim 1, wherein the message is a Short Message Service (SMS) message.

6. The method of claim 1, wherein the first and second service commands are Short Message Service (SMS) messages.

7. The method of claim 1, wherein returning the results comprises sending a Short Message Service (SMS) message, and wherein receiving a message comprises receiving a SMS message.

8. The method of claim 1, wherein the personalized service command macro defines a sequence in which the first service command and the second service command are to be executed.

9. The method of claim 1, wherein the personalized service command indicates that the second service command operates on results of the first service command.

10. An apparatus comprising:
a processor; and
a memory, at least one of the processor or the memory being adapted for:
receiving two or more service commands including a first service command and a second service command from a user via a graphical user interface such that the first service command, the second service command, and one or more search services are presented in relation to one another via one or more graphical pipes;
storing the two or more service commands such that first service command, the second service command, and the one or more search services are linked according to the one or more graphical pipes as a personalized service command macro corresponding to a user;
receiving a message at the server from a mobile device, wherein the message includes second authentication information and an identification of the user; and
executing, at the server, the personalized service command macro corresponding to the user and returning results of the personalized service command macro to the mobile device according to whether the second authentication information matches first authentication information corresponding to the user;
wherein executing the personalized service command macro comprises executing one or more search queries via the one or more search services;
wherein the results of the personalized service command macro comprise search results obtained as a result of executing the one or more search queries via the one or more search services.

11. The apparatus of claim 10, wherein the memory comprises a database.

12. The apparatus of claim 10, wherein the one or more service commands comprise a first service command and a second service command, wherein the first and second service commands are Short Message Service (SMS) messages.

13. The apparatus of claim 10, wherein returning the results comprises sending a Short Message Service (SMS) message, wherein receiving a message comprises receiving a SMS message.

14. The apparatus of claim 10, wherein the two or more service commands comprise one or more commands to be applied to results of the one or more search queries such that results of the personalized service command macro are generated.

15. The apparatus of claim 14, wherein the two or more service commands comprise an aggregation command.

16. The apparatus of claim 10, wherein the personalized service command macro represents a single search query, and wherein executing the personalized service command macro comprises executing the single search query.

17. The apparatus of claim 10, wherein executing the personalized service command macro comprises executing one or more search queries via two or more search services.

18. The apparatus of claim 10, wherein the two or more service commands comprise one or more of the following service commands: find lowest price, query yahoo answers, translate languages, get sports score updates, get financial information, convert currency or units, travel information, and job listings or search.

19. The apparatus of claim 14, wherein the two or more service commands comprise a sorting command.

20. An apparatus comprising:
    means for receiving, at a server, a first service command and a second service command from a user via a graphical user interface such that the first service command, the second service command, and one or more search services are presented in relation to one another via one or more graphical pipes;
    means for storing the first service command and the second service command such that the first service command, the second service command, and the one or more search services are linked according to the one or more graphical pipes as a personalized service command macro corresponding to the user;
    means for receiving a message at the server from a mobile device, wherein the message includes second authentication information and an identification of the user; and
    means for executing, at the server, the personalized service command macro corresponding to the user and returning results of the personalized service command macro to the mobile device according to whether the second authentication information matches first authentication information corresponding to the user;
    wherein executing the personalized service command macro comprises executing one or more search queries via the one or more search services;
    wherein the results of the personalized service command macro comprise search results obtained as a result of executing the one or more search queries via the one or more search services.

21. The apparatus of claim 20, wherein the message is a Short Message Service (SMS) message.

22. A program storage device readable by a machine tangibly embodying a program of instructions executable by the machine to perform a method comprising:
    receiving, at a server, a first service command and a second service command from a user via a graphical user interface such that the first service command, the second service command, and one or more search services are presented in relation to one another via one or more graphical pipes;
    storing the first service command and the second service command such that the first service command, the second service command, and the one or more search services are linked according to the one or more graphical pipes as a personalized service command macro corresponding to the user;
    receiving a message at the server from a mobile device, wherein the message includes second authentication information and an identification of the user; and
    executing, at the server, the personalized service command macro corresponding to the user and returning results of the personalized service command macro to the mobile device according to whether the second authentication information matches first authentication information corresponding to the user;
    wherein executing the personalized service command macro comprises executing one or more search queries via one or more search services;
    wherein the results of the personalized service command macro comprise search results obtained as a result of executing the one or more search queries via the one or more search services.

23. The program storage device of claim 22, wherein the first and second service commands are Short Message Service (SMS) messages.

24. The program storage device of claim 22, wherein returning the results comprises sending a Short Message Service (SMS) message, and wherein receiving a message comprises receiving a SMS message.

* * * * *